Patented Jan. 27, 1931

1,790,049

UNITED STATES PATENT OFFICE

FRANKLIN E. KIMBALL, OF LONG BEACH, CALIFORNIA

PROCESS OF RECOVERING AND PURIFYING DILUTE SULPHURIC ACID FROM ACID SLUDGE

No Drawing.    Application filed September 30, 1929.    Serial No. 396,402.

My invention relates to the treatment of acid sludge obtained by the action of sulphuric acid on petroleum oils or distillates, for recovering the sulphuric acid therefrom.

In the various processes previously employed for recovering sulphuric acid from acid sludge such as that disclosed in the patent to William N. Davis et al., No. 1,511,721, issued October 14, 1924, dilution of the acid sludge by the use of water is first effected and then the entire mass is subjected to a heat and pressure treatment for hydrolyzing the acid sludge to recover the dilute sulphuric acid. It is well known that sulphuric acid recovered by this and similar processes is impure, and hence it is a purpose of my invention to provide a process of treating the acid sludge to recover relatively more pure dilute sulphuric acid.

When dilute sulphuric acid derived from acid sludge is concentrated by evaporation of the water therein, about two per cent by weight of finely divided carbon results in the concentrated acid and as a result of experiment I have found that merely upon dilution of the sludge with water hydrolysis is effected, oil is liberated and most of the carbon suspends itself within the oil, and therefore can be removed from the dilute acid by drawing off the oil. In this manner, a partial purification of the dilute sulphuric acid is effected. As is well known, acid sludge derived from the use of sulphuric acid containing carbon is very refractory. Hence, if a major portion of the carbon can be removed from the acid sludge prior to that hydrolyzing treatment which consists of subjecting the mass to heat and pressure, not only is effected a preliminary purification of the sulphuric acid, but there is facilitated a more efficient hydrolysis effected by heat and pressure, and in consequence, the final dilute sulphuric acid recovered is of greater degree of purity and therefore produces higher yield upon concentration.

In my process, I effect this preliminary removal of carbon and oil by the preliminary elimination of the presence of a major portion of the oil, for the carbon which is formed upon heating the oil in the hydrolyzing treatment, is reduced to a minimum as to quantity in view of the small amount of oil remaining in the acid sludge. In reducing the amount of carbon formed in the mass, formation of emulsion with a loss of acid is likewise prevented. As less stock remains to be submitted to pressure and heat treatment, the cost of the entire process is greatly reduced.

Although my process is applicable to all acid sludges that are found to separate oil and dilute sulphuric acid upon diluting with water, in giving a practical illustration of my process I will describe it in connection with the treatment of acid sludge derived from the acid treatment of "cracked" gasoline, but it is to be understood that my invention is not limited or restricted to this form of acid sludge nor to the precise quantities, proportions, temperature and pressure recited.

In the application of my process to "cracked" gasoline, 250 tons of "cracked" gasoline may be treated with 5 tons of 66° Baumé sulphuric acid containing about 2% of fine carbon yielding 7 tons of 40° Baumé acid sludge. My process in respect to acid sludge derived in this manner comprises diluting the acid sludge by mixing therewith in a suitable vessel, 3 tons of water. This mixing operation is done by admitting the water to the bottom of the vessel containing the acid sludge. After settling about 24 hours, there is found to be 2 tons of oil floating on 8 tons of 33° Baumé gravity sulphuric acid. The sulphuric acid is drawn from the vessel and placed in a suitable and heat insulated drum of such capacity that the acid does not completely fill it but leaves an air space thereabove. By admitting steam to the bottom of the drum so that it passes upwardly through the acid, the air above the acid is driven from the drum through a suitable vent, and until the temperature at the top of the drum is about 200° F., indicating the absence of air. The vent is now closed and the heating continued until the pressure exceeds 50 pounds per square inch gauge pressure, and the temperature exceeds 300° F. Once this pressure and temperature is exceeded, the steam supply is cut off, and the heated acid allowed to settle for about one hour. We now find that the drum contains 8¼ tons of 32° Baumé gravity sulphuric acid and one-half ton of oil separated from the acid. The final separation of the oil from the acid is accomplished by withdrawing either from the drum.

Although I have herein shown and described only one process of recovering and purifying dilute sulphuric acid from acid sludge embodying my invention, it is to be understood that various changes and modifications may be made herein without departing from the spirit of the invention and the spirit and scope of the appended claims.

I claim:

1. A process of recovering and purifying dilute sulphuric acid from acid sludge, which consists in the addition of water to effect the separation of oil, removing the separated oil from the dilute acid, expelling the fixed gases from the dilute acid, subjecting the dilute acid to a temperature above its atmospheric boiling point to effect separation of the remaining oil, and finally separating the dilute acid from the separated oil.

2. A process of recovering and purifying dilute sulphuric acid from acid sludge, which consists in the addition of water to effect the separation of oil, removing the separated oil from the dilute acid, subjecting the dilute acid to a temperature above its atmospheric boiling point to effect a separation of the remaining oil, and finally separating the dilute acid from the separated oil.

3. A process of recovering and purifying dilute sulphuric acid from acid sludge, which consists in the addition of water to effect the separation of oil until the 33° Baumé gravity is reached, removing the separated oil from the dilute acid, expelling the fixed gases from the dilute acid, subjecting the dilute acid to a temperature of from between 300° to 320° F. under a pressure of between 50 and 60 pounds gauge to effect separation of the remaining oil, and finally separating the dilute acid from the separated oil.

4. A process of recovering and purifying dilute sulphuric acid from acid sludge, which consists in the addition of water to effect the separation of the oil until the 33° Baumé gravity is reached, removing the separated oil from the dilute acid, subjecting the dilute acid to a temperature of from between 300° to 320° F. under a pressure of between 50 and 60 pounds gauge to effect separation of the remaining oil, and finally separating the dilute acid from the separated oil.

FRANKLIN E. KIMBALL.